(No Model.)
J. I. LEDNUM.
Kneading Machine.
No. 235,260. Patented Dec. 7, 1880.
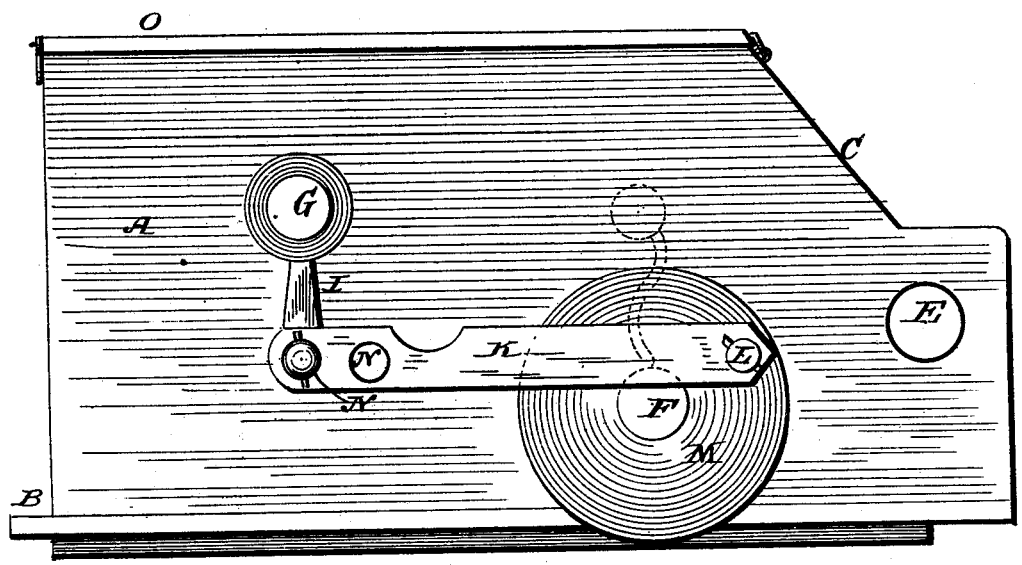
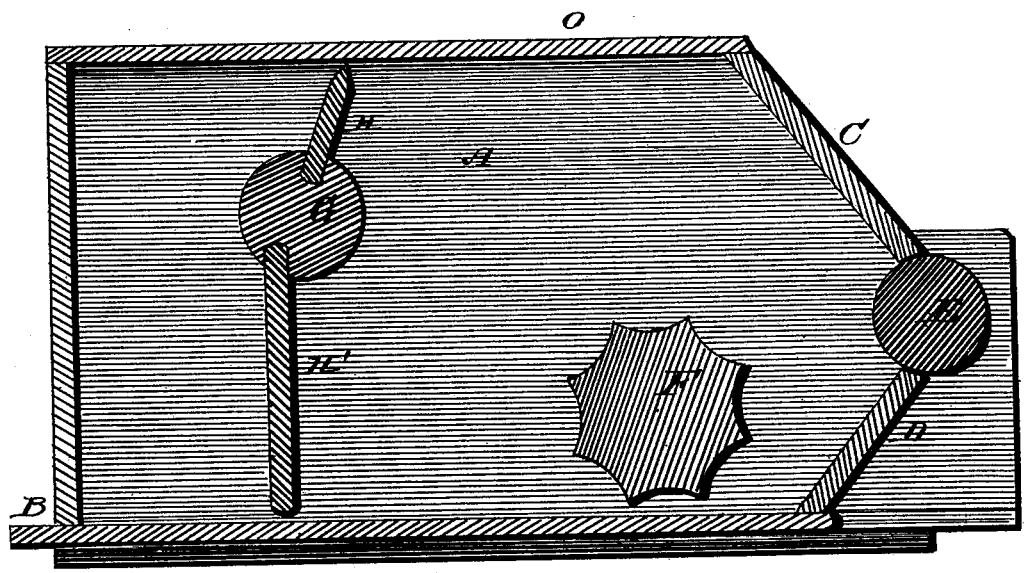
Witnesses
F. G. Dieterich
A. H. Krause
Inventor,
James I. Lednum
by Louis Bagger & Co.
Attorneys

UNITED STATES PATENT OFFICE.

JAMES I. LEDNUM, OF DENTON, MARYLAND.

KNEADING-MACHINE.

SPECIFICATION forming part of Letters Patent No. 235,260, dated December 7, 1880.

Application filed October 1, 1880. (No model.)

*To all whom it may concern:*

Be it known that I, JAMES I. LEDNUM, of Denton, in the county of Caroline and State of Maryland, have invented certain new and useful Improvements in Kneading-Machines; and I do hereby declare that the following is a full, clear, and exact description of the invention, which will enable others skilled in the art to which it appertains to make and use the same, reference being had to the accompanying drawings, which form a part of this specification, and in which—

Figure 1 is a side elevation, and Fig. 2 is a longitudinal vertical section.

Similar letters of reference indicate corresponding parts in both the figures.

My invention relates to machines for kneading and working dough; and it consists in the construction and combination of parts of a machine of that class, as hereinafter more fully set forth, and particularly pointed out in the claim.

In the accompanying drawings, A is a box made with straight sides and one straight end, while the other end consists of two boards, C D, inclined in opposite directions and with an open space between them, in which works a roller, E, that is journaled in the projecting side pieces of the box at about an equal distance from the top and bottom. In front of this roller is another fluted or corrugated roller, F, which I call the "main roller," and which is operated by a crank and handle. In front of this, again, in the forward end of the box, is the dough-mover, which consists of a shaft, G, having two wings or blades, H H', as clearly shown in the drawings. An oscillating motion is imparted to the shaft G, with its wings, by a crank, I, and pitman K, the other end of which is pivoted on a wrist-pin, L, on disk M, which is keyed upon the projecting end of the shaft or journal of the fluted roller F. Pitman K has two or more perforations, N, by means of which its stroke may be adjusted with reference to crank I of the dough-mover or pusher.

O is a detachable cover, and the box may be secured upon a table or stand by screws inserted through a projecting bracket, B, at one end of the box.

The operation of this machine is as follows: The dough to be worked is placed in the box between the dough-mover G H H' and the fluted roller F, by turning the crank of which the dough is fed under the roller into the rear end of the box and pushed up the inclined board D and against roller E, which, with the upper inclined board, C, turns the dough over back upon roller F. Here the pusher G H H' comes into operation by pushing the dough against and in under the fluted main roller F, thus working it over a second time, and so on until the batch of dough has been sufficiently worked and is ready for the oven.

Any child can work the machine and make a better quality of dough than can be kneaded by hand, care being taken that the dough is of the proper temperature when put into the box.

By adjusting the pitman K upon crank I, the stroke of the dough mover or pusher may be regulated to suit a large or a small batch of dough, and I have found that by the use of this machine less lard is required than when the dough is worked by hand, thus saving expense as well as time and labor, and making a better and more palatable article of bread.

Having thus described my invention, I claim and desire to secure by Letters Patent of the United States—

The kneading-machine composed of the box A, having inclined end boards, C D, feed-roller E, fluted main roller or kneader F, and pusher G H H', constructed and combined to operate substantially as and for the purpose herein shown and specified.

In testimony that I claim the foregoing as my own I have hereto affixed my signature in presence of two witnesses.

JAMES IGNATIUS LEDNUM.

Witnesses:
OVID EARL ROCHESTER,
NOAH ALEXANDER HUTSON.